United States Patent [19]
Bode

[11] 3,895,245
[45] July 15, 1975

[54] ELECTRIC MOTOR UTILIZING PERMANENT MAGNETS

[76] Inventor: George Fred Bode, Rt. No. 1, Middletown, Md. 21769

[22] Filed: May 23, 1974

[21] Appl. No.: 472,909

[52] U.S. Cl. .................................. 310/46; 310/103
[51] Int. Cl. ............................................. H02k 37/00
[58] Field of Search ............ 310/46, 112, 114, 115, 310/126, 103, 83

[56] References Cited
UNITED STATES PATENTS

| | | | |
|---|---|---|---|
| 1,724,446 | 8/1929 | Worthington | 310/46 |
| 1,889,208 | 11/1932 | Masterson et al. | 310/115 X |
| 1,893,629 | 1/1933 | Masterson et al. | 310/115 X |
| 1,963,376 | 6/1934 | Papas | 310/103 X |
| 3,703,653 | 11/1972 | Tracy et al. | 310/103 X |
| 3,811,058 | 5/1974 | Kiniski | 310/103 X |
| 3,814,962 | 6/1974 | Baermann | 310/103 |

Primary Examiner—Donovan F. Duggan

[57] ABSTRACT

An electric motor is composed of two counter-rotating discs having intermeshing gearing and each carrying a plurality of permanent magnets radially arranged with the same poles at the periphery of both discs. A shield of magnetic material is provided at one side extending partly around the periphery of each of the discs and into substantially the bite of the discs. An electromagnet is arranged with one pole adjacent the bite of the discs, with means to energize the electromagnet as each of the permanent magnets reaches the bite of the discs to create a field of such polarity as to make the magnetic poles of the adjacent permanent magnets move away from the bite of the discs in the direction away from the shield, utilizing the combined forces of the electromagnetic force and the repelling force of the permanent magnets to effect rotation.

5 Claims, 11 Drawing Figures

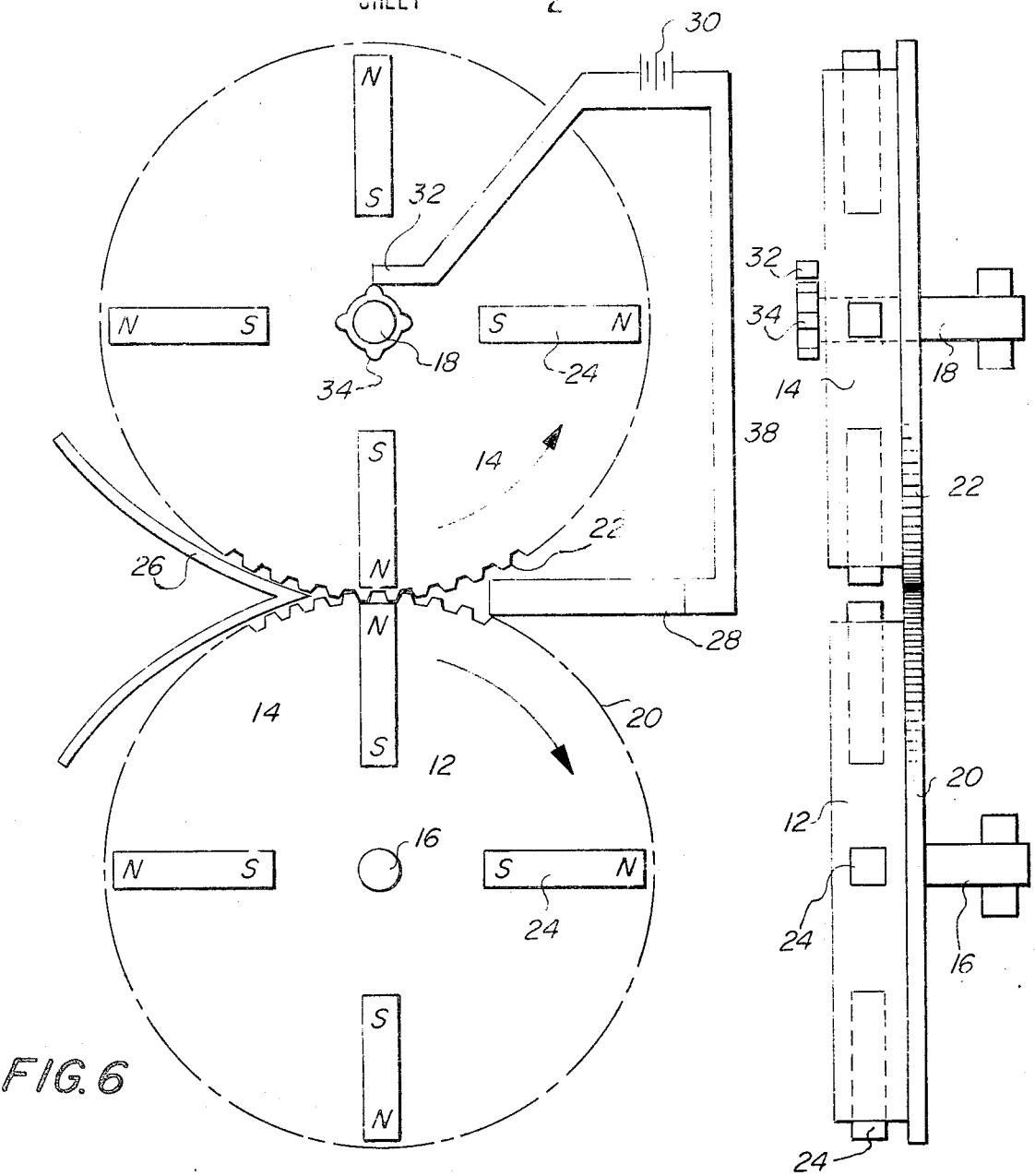
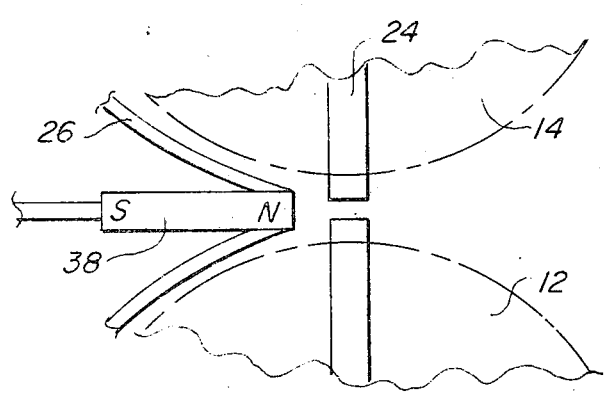
FIG. 6
FIG. 7
FIG. 8

ELECTRIC MOTOR UTILIZING PERMANENT MAGNETS

BACKGROUND OF THE INVENTION

1. Field of the Invention

The invention relates to an electric motor relying on permanent magnets and an electromagnet for its operation.

2. The Prior Art

Various attempts have been made to create motors utilizing the power of permanent magnets, but these seem never to have been commercially successful.

SUMMARY OF THE INVENTION

The invention relates to a new, highly efficient electrically operated motor, particularly suited for automotive, truck or other systems requiring a compact, high-powered engine which is independent of gasoline or similar fuels and operates pollution-free.

The invention provides a motor which utilizes the power of permanent magnets along with an electromagnet operating in synchronism with the movement of the permanent magnets in order to produce turning of a shaft. It is particularly desirable from the ecological point of view, since the battery can be recharged, at any point where sufficient electric current is available, while the magnets can be renewed or recharged in the machine, and there is no consumption of gasoline or other fuels which will contaminate the atmosphere.

The device provides an arrangement by which, with a reasonable battery storage capacity, and with adequate permanent magnets, vehicles can be operated for considerable distances and over considerable period of time without the necessity for recharging, other than an occasional charge of the storage battery.

Fundamentally, the concept of rotating electrical machinery follows certain well-established and undisputed laws governing the actual operation. One such law which is applicable to very machine is the law of conservation of energy. This law states that energy is given to a body when work is done upon it and in this process there is merely a transfer of energy from one body to another. In such transfer, no energy is created or destroyed; it merely changes from one form to another.

This statement does not indicate the efficiency with which the transfer takes place. It must be assumed that the transfer takes place with somewhat less than 100 percent efficiency, as otherwise the output could be coupled to the input and the device would sustain itself, which is not believed possible. In other words, losses always occur which place an upper limit to the efficiency and preclude the possibility of perpetual motion.

However, when the term "efficiency" is applied discretely, under properly defined conditions, it is possible to arrive at apparent efficiencies exceeding 100 percent. A simple example will illustrate a point and serve as a basis for defining a term "user efficiency" which will be employed in the following discussion.

Assuming an analogy to a magnetic engine to be described herein, such as one which operates on compressed gas and includes a conversion device such as a turbine which converts the energy of the compressed gas to rotary motion. Further assume that there is an endless supply of compressed gas which is released, as required, by means of some control element which demands very little power compared to the output of the compressed gas turbine. Under this condition, the output exceeds the input to the control device and the efficiency is greater than 100 percent. In the end, however, the compressed gas will be dissipated, and the battery discharged, requiring the entire system to be supplied with energy again. It will then be found that the entire sum of energy supplied to the system exceeds the energy removed from it, resulting in overall efficiency less than 100 percent.

In the present context, magnetic energy is used to replace the compressed gas concept and offers a method of storing large amounts of energy for long periods of time. Furthermore, the magnetic energy can be released in an orderly manner which does not require excessive amounts of energy from a lead-acid battery pack used to control the magnetic energy.

In principle, according to the invention, the motor is composed of two counter-rotating members, preferably disc rotors, which are connected by gearing so as to turn at the same speed in opposite directions. Each of the rotors carries a plurality, preferably four, equi-angularly spaced permanent magnets extending radially of the discs, the permanent magnets being so positioned that they are opposite each other when passing the bite of the rotors. In the preferred form, all of the permanent magnets have the same poles at the peripheries of the rotors and the opposite pole adjacent the centers of the rotors.

There is also provided a magnetic shield, composed of a generally V-shaped member of a magnetic material, such as tin-plated steel, the point of which extends up almost to the bite of the rotors, while its legs are somewhat curved about a radius of curvature greater than that of the rotors.

In the vicinity of the bite of the rotors, preferably on the opposite side from the shield there is arranged an electromagnet energized by a storage battery or other current source. Timing mechanism is provided which, when any pair of opposed electromagnets reaches the bite of the rotors, energizes the electromagnet to create a pole adjacent the outer ends of the permanent magnets and of opposite polarity, so as to pull the permanent magnets past the dead center or aligned position.

In a modified form, the electromagnet may be placed at the point of the V-shaped shield and is then arranged so that its end adjacent the bite of the rotors has the same plurality as the outer poles of the permanent magnets, so as to push or repel them past the dead-center position.

Other objects and advantages of the invention will appear more fully from the following description, particularly when taken into conjunction with the accompanying drawings which form a part thereof.

BRIEF DESCRIPTION OF THE DRAWINGS

In the drawings:

FIG. 6 shows in side elevation a motor in accordance with the invention;

FIG. 7 is a side view of the motor of FIG. 6; and

FIG. 8 shows a detail of a modified form of the invention;

DESCRIPTION OF THE PREFERRED EMBODIMENTS

Figure 1:
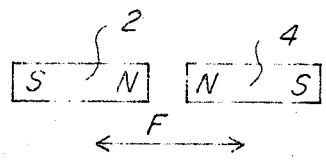
FIGS. 1 to 5 are diagrams for explaining the background of the invention.

FIG. 1 shows two magnets 2 and 4, of the ordinary bar type placed in close proximity to each other illustrating in a simple manner that two poles of like polarity repel each other. Further, with certain restrictions, they generally repel each other with a force F that is directly proportional to the product of the individual pole strengths, and inversely proportional to the square of the distance separating them. In addition, the force is affected by the permeability of the medium through which the force acts. For ordinary air the numerical value of the permeability is very nearly unity and is not used in calculation.

Figure 2:
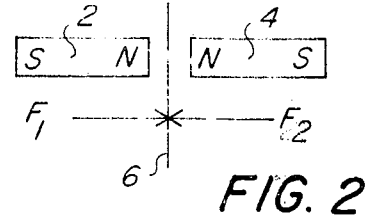

FIG. 2 shows an identical pair of bar magnets, the only difference being that a piece 6 of ferromagnetic material has been shown inserted between the poles. Under this condition an important effect is observed. The poles no longer repeal each other; they are, as a matter of fact in apparent attraction as indicated by $F_1$ and $F_2$. Theoretically, the individual magnets induce a pole of opposite polarity in the ferromagnetic material and are thereby attracted to it. Suitable arrangements of air gaps in conjunction with other factors allow this apparent attraction to remain throughout a very wide range of pole strengths, and thicknesses of the ferromagnetic material.

This action actually occurs and the effect can be used to recover large amounts of the energy stored in the magnetic fields of permanent magnets.

Figure 3:
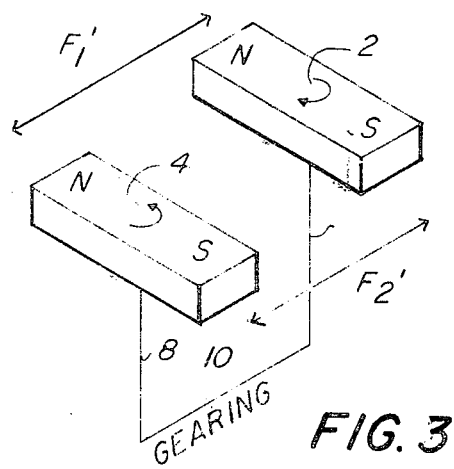

Next, attention is directed to FIG. 3 where similar magnets are attached to turn about fixed individual axes 8 physically geared together at 10. This arrangement is intended to confine the rotation of the magnets to a circular path, each magnet rotating in an opposite direction from the other. With these restrictions, the system will reach a state of equilibrium as shown where the force $F_1'$ is equal and opposite to the force $F_2'$, rendering the system stationary.

Figure 4:
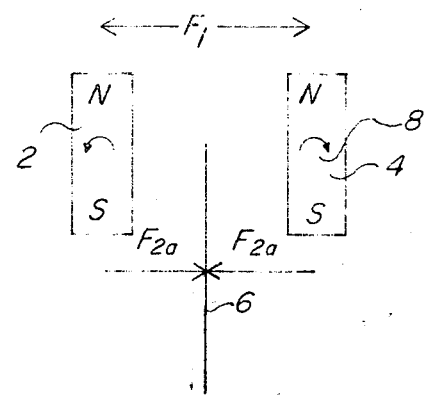

Now, referring to FIG. 4, visualize this as a plan view of FIG. 3, without showing the shafts and gears. In other words, the right hand bar magnet 4 of FIG. 4 is considered to rotate clockwise about the center axis 6 of the magnet in a plane parallel to the plane of the paper. The left hand magnet 2 rotates in the opposite direction. Without the benefit of ferromagnet material 6 inserted between the south poles of FIG. 4, the bar magnets will align themselves parallel to each other as shown. If we now restrain the magnets in the parallel position and insert the ferromagnetic material, the forces can be illustrated as shown in FIG. 4, where the sum of the forces $F_{2a}$ and $F_{2b}$ complement the value of $F_1$, and the system is no longer in a state of equilibrium. If unrestrained, magnets will turn about axes 6 in the directions indicated. It can be seen that the insertion of the ferromagnetic material causes an apparent reversal of forces imparting rotation to the system in the direction intended.

Figure 5:
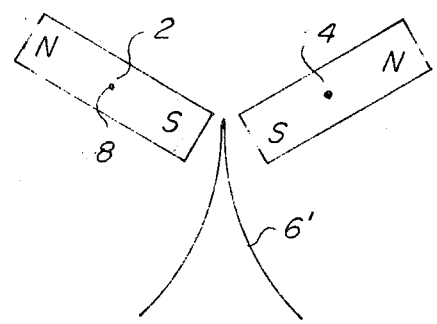

FIG. 5 shows this condition, along with a modification of the shape of the ferromagnetic material 6'. A study of the prevailing forces which prevail in this diagram will lead to the conclusion that if a short burst of external energy, of the proper polarity is applied to the system at this time two of the poles are nearest dead center (in this case, south pole), they will be kicked past dead center and beyond the influence of the ferromagnetic material. The two south poles will now develop a force repelling each other, and the north poles will develop new forces attracting them towards the shield until they reach a point just before dead center where they will stop unless the external energy is applied again in the form of a short burst. It is evident that the external energy must be applied in such phase that it aids rotation or else a portion of the energy extracted from the magnets is cancelled and the system will not work.

It is important to note at this point that the energy injected into the system in the manner and time specified will add to any energy extracted from the magnets. Therefore, the total output energy is the sum of the external energy injected, plus the energy extracted from the magnetic fields of the permanent magnets, minus the energy used to overcome any losses.

Experimentally it has been determined that the losses do not increase as rapidly as the output, providing a basis for the assumption that it is possible to control substantial amounts of output power with relatively small amounts of energy derived from a lead-acid battery control source. The impact of this statement is apparent as indicating that an engine of this type could be used to power an automobile for a considerable amount of time before it would be necessary to recharge the batteries.

It is equally important to note that it is not necessary to inject external energy continuously. As a matter of fact, the external energy must be injected for a very brief time around dead center or the system will not work. Quickly, after the poles at dead center have been kicked past the dead center position, the input energy must be turned off and the forces developed by the permanent magnets left to supply their contribution to the output of the system. The advantages of not having to supply energy over the engine cycle are obvious also. The instantaneous demand may be high, but if the energy is only supplied for a short time the average energy demand is much lower.

Finally, the discussion thus far is based on a system employing a single bar magnet in each rotating head. This results in having to reverse the polarity of the external energy source because alternately north and south poles appear at the dead center position. This condition is easily taken care of by the arrangement shown in FIGS. 6 to 8.

Referring to FIGS. 6 to 8, there are two rotors 12 and 14 mounted on shafts 16 and 18, respectively, from one of which power may be taken. The rotors are caused to turn in opposite directions in the same speed by meshing gears 20 and 22 mounted on the shafts 16 and 18, respectively.

Each of the rotors carries a plurality of permanent magnets 24, which are arranged radially in the rotors with the same poles at the periphery and the opposite poles adjacent the center of the rotors. At one side of the rotors there is a magnetic shield 26, which may for example be of tin-plated steel, which is of generally V-shape and has its point adjacent the bite of the rotors. The legs of the V-shape are arcuate, each having a radius of curvature somewhat greater than the radius of curvature of the rotors, so that they gradually diverge from the rotors. The legs of the shield extend about 90° around the periphery of the rotors.

On the side of the bite of the rotors opposite the shields, there is an electromagnet 28 which is connected to a storage battery 30 by a make-and break-switch 32, operated by cam 34 having four projecting cam portions, corresponding generally in position to the permanent magnets, so as to close the switch 32 as each pair of permanent magnets reaches the aligned position at the bite of the rotors.

In such a device, as the magnets approach the magnetic shield 26, they are attracted thereto and cause the rotors to turn in the directions shown opposite to each other. When the rotors reach the bite of the rotors, the electromagnet 28 is energized in such a way as to create a pole of opposite polarity to the outer poles of the rotors; that is when the permanent magnets have their north poles outwardly the electromagnet pole adjacent the bite of the rotors is a south pole. This will pull the permanent magnets around in the direction of rotation, and past the dead-center point, whereupon the electromagnet is de-energized and the permanent magnets which have just passed the dead-center point because of their repulsion continue to cause turning of the rotors, while the following magnets approach the shield and are attracted thereby so as to cause the rotation to continue.

It may be necessary to start the rotors in motion at the beginning of the operation which can either be done by hand or by an electric starting motor. Once rotation is started, it continues until the electromagnet 28 is no longer energized, which can be accomplished by opening a hand switch 38.

In a modification shown in FIG. 8, the electromagnet 28 is placed on the same side as the shield 26 with one end extending into a gap in the shield adjacent the bite of the rotors. In this case, the electromagnet is energized in such a way that the hole adjacent the bite of the rotors has the same polarity as the outer ends of the permanent magnets, so as to repel the permanent magnet poles which are adjacent the bite of the rotors and to drive them in rotation.

Such an arrangement provides a device which does not create fumes or other undesirable vapors, and which can operate for considerable periods of time with only an occasional recharging of the storage battery, since a majority of the energy is obtained from the permanent magnets. These can be re-magnetized at considerable intervals, so that operation of a device over long periods of time is practical and effective.

While the arrangement shown is of course the most convenient to explain the theory, it is practical that the outer ends of the magnets could be of alternatingly opposite polarity, which would however require two electromagnets, one as shown in FIG. 6 and one as shown in FIG. 8, which would also be alternately energized to produce the necessary polarity.

Figure 9:
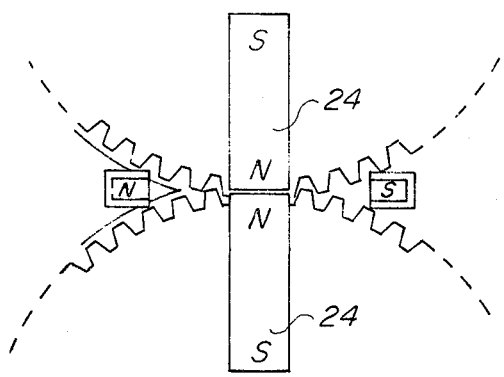
FIG. 9 shows in side elevation a part of a further modification of the invention.
Figure 10:
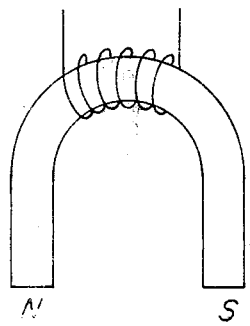
FIG. 10 is a plan view of a part of FIG. 9.

In the arrangement according to FIGS. 9 and 10, there is arranged adjacent the bite of the rolls an electromagnet, possibly of the horseshoe type, which has its poles on opposite sides of the bite of the rolls. When this is energized, the north pole will impart a repellent force to the north poles of the magnets 24 and the south pole will exert an attracting force, the two forces thus reinforcing each other.

Figure 11:
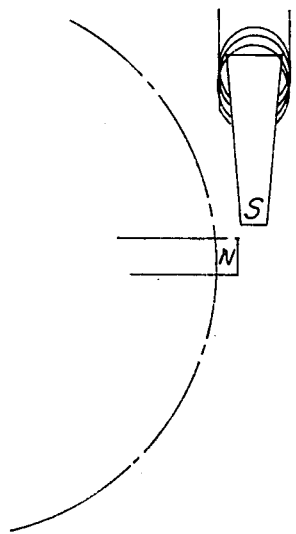
FIG. 11 shows a further possible modification.

As is shown in FIG. 11, it is not essential that the electromagnet be at the bite of the rotors. It could be at various placed around the periphery of the rotors, and one or several such magnets can be used, to impart either attractive or repulsive forces to the rotors.

I claim:

1. An electric motor comprising a pair of rotors, means for causing the rotors to rotate in opposite directions at the same speed, a plurality of permanent magnets carried by each rotor and angularly spaced therearound, the permanent magnets extending radially and being angularly positioned so that a pair of magnets, one of each rotor come opposite each other at the bite of the rotors, the outer poles of the magnets opposing each other being of the same polarity, a magnetic shield of ferromagnetic material having its edge adjacent the bite of the rotors and extending away from the bite of the rotors for a substantial distance, and electromagnet means having one pole adjacent the periphery of at least one of the rotors, and means responsive to the rotation of the rotors for energizing the electromagnet means temporarily as a permanent magnet approaches said electromagnet means, with the end of the electromagnet adjacent the periphery of the rotor having a polarity such as to produce movement of the outer ends of the permanent magnets at the bite in the direction away from the electromagnetic shield.

2. An electric motor as claimed in claim 1, in which the outer ends of the permanent magnets have the same polarity and said electromagnet means is on the opposite side of the bite of the rotors from the shield and the end of the electromagnet nearest the bite of the rotors has a polarity opposite to that of the outer ends of the permanent magnets.

3. An electric motor as claimed in claim 1, in which the outer ends of the permanent magnets have the same polarity and the electromagnet means is on the same side of the bite of the rotors as the shield and the end of the electromagnet nearest the bite of the rotors has the same polarity as the outer ends of the permanent magnets.

4. An electric motor as claimed in claim 1, in which the shield is substantially V-shaped and said electromagnet means has one pole adjacent the bite of the rotors.

5. An electric motor as claimed in claim 1, in which the legs of the shield diverge from the peripheries of the rotors away from the bite of the rotors.

* * * * *